(12) United States Patent
Aoki (10) Patent No.: US 8,942,537 B2
(45) Date of Patent: Jan. 27, 2015

(54) CONTENT REPRODUCTION APPARATUS AND CONTENT PROCESSING METHOD THEREFOR

(71) Applicant: Yamaha Corporation, Hamamatsu-shi, Shizuoka-ken (JP)

(72) Inventor: Ryotaro Aoki, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 14/044,029

(22) Filed: Oct. 2, 2013

(65) Prior Publication Data

US 2014/0029677 A1   Jan. 30, 2014

Related U.S. Application Data

(63) Continuation of application No. 13/308,625, filed on Dec. 1, 2011, now Pat. No. 8,712,210.

(30) Foreign Application Priority Data

Dec. 3, 2010 (JP) ................................. 2010-270269
Aug. 31, 2011 (JP) ................................. 2011-190145

(51) Int. Cl.
*H04N 5/765* (2006.01)
*H04N 19/85* (2014.01)
*H04N 9/802* (2006.01)

(52) U.S. Cl.
CPC ......... *H04N 19/00903* (2013.01); *H04N 9/802* (2013.01)
USPC ........... 386/232; 386/285; 386/326; 386/339; 386/340; 386/341; 386/248

(58) Field of Classification Search
USPC .................. 386/232, 285, 326, 339–341, 348
See application file for complete search history.

(56) References Cited

U.S. PATENT DOCUMENTS 6,629,283 B1 * 9/2003 Toyama ........................ 714/746
7,797,065 B2   9/2010 Zaucha et al.
(Continued)

FOREIGN PATENT DOCUMENTS

JP   07-131770 A   5/1995
JP   2006-019947 A   1/2006
(Continued)

OTHER PUBLICATIONS

JP OA issued Dec. 25, 2012 for JP 2011-190145, cited in U.S. Appl. No. 13/308,625.

*Primary Examiner* — Helen Shibru
(74) *Attorney, Agent, or Firm* — Rossi, Kimms & McDowell LLP (57) ABSTRACT

A content reproduction apparatus that adopts a content processing method includes a video processor, a video analyzer, and an audio processor for processing audio data and video data input thereto. The video analyzer analyzes video characteristics of video data such as resolutions, compressive distortions, and real frame rates. The video processor processes video data in accordance with video processing, which is determined based on analyzed video characteristics of video data. The audio processor processes audio data in accordance with audio processing, such as dynamic range compression and/or frequency component extension/enhancement, which is determined based on analyzed video characteristics of video data. Thus, it is possible to reproduce sound in an articulate manner depending on the video quality, which is either professional-level video shooting or nonprofessional-level video shooting.

4 Claims, 7 Drawing Sheets

(56) References Cited

U.S. PATENT DOCUMENTS

| | | |
|---|---|---|
| 7,940,941 B2 | 5/2011 | Akiyama et al. |
| 8,090,120 B2 | 1/2012 | Seefeldt |
| 8,334,888 B2 | 12/2012 | Neuman et al. |
| 8,504,181 B2 | 8/2013 | Seefeldt et al. |
| 2002/0006203 A1* | 1/2002 | Tachibana et al. ............ 380/269 |
| 2008/0052516 A1* | 2/2008 | Tachibana et al. ............ 713/176 |
| 2009/0016547 A1 | 1/2009 | Aoki et al. |
| 2009/0304190 A1 | 12/2009 | Seefeldt et al. |
| 2010/0271386 A1 | 10/2010 | Lee |
| 2011/0058056 A1 | 3/2011 | Lindahl et al. |
| 2011/0196523 A1* | 8/2011 | Akiyama et al. ................ 700/94 |
| 2012/0141098 A1* | 6/2012 | Aoki ............................ 386/353 |

FOREIGN PATENT DOCUMENTS

| | | |
|---|---|---|
| JP | 2007-178675 A | 7/2007 |
| JP | 2008-306351 A | 12/2008 |

* cited by examiner

CONTENT REPRODUCTION APPARATUS AND CONTENT PROCESSING METHOD THEREFOR

BACKGROUND OF THE INVENTION

1. Field of the Invention

The present invention relates to content reproduction apparatuses and content processing methods, which reproduce audio content in conjunction with video content.

The present application claims priorities on Japanese Patent Application No. 2010-270269 filed Dec. 3, 2010, and Japanese Patent Application No. 2011-190145 filed Aug. 31, 2011, the entire contents of which are incorporated herein by reference.

2. Description of the Related Art

Recently, television receivers have been developed to cope with various interfaces using different types of input terminals such as HDMI and analog input terminals (NTSC) in conjunction with tuners for receiving and reproducing television signals. Patent Document 1 discloses an example of a television receiver equipped with digital input terminals such as an HDMI (High-Definition Multimedia Interface) and a DVI (Digital Video Interface), each of which is selectively used. Additionally, some television receivers have been designed to incorporate memory card slots. Input terminals of television receivers can be connected to game devices, Internet-connectable personal computers, home video devices, or the like.

Since television broadcasting stations optimize television signals representing video images and audio sounds to secure high-quality reproduction in advance, the tuners of television receivers are able to demodulate television signals and reproduce video images and audio sounds with a high quality. In contrast, video images produced by nonprofessional users using personal computers or home video devices are not optimized to secure high-quality reproduction, and video images downloaded from the Internet are compressed at a high compressibility and are not necessarily suited to high-quality reproduction. Video images shot by nonprofessional users are rarely adjusted in terms of audio/video quality after shooting, so that the audio setting thereof may be fluctuated to produce higher/lower sound volumes than expected sound volumes. Such video images may be occasionally reproduced with extremely high or low sound volumes. Additionally, video images may be compressed by eliminating high-pitch registers in order to achieve a high compressibility. For this reason, it is necessary to improve audio processing of audio/video apparatuses so that audio sound can be reproduced in an articulate manner depending on its video reproduction quality.

In general, video files recorded on video recording media include various pieces of attribute information, such as device-type information of cameras used for video shooting, video compressing algorithms, resolutions, color-bit counts, frame rates, audio compressing algorithms, sampling rates, sample-bit counts, and bit rates. In contrast, video data input to video input terminals such as HDMI and analog input terminals are streaming signals which are decoded and reproduced by external devices, so that video data may have lost attribute information thereof. For this reason, it is difficult for television receivers to determine how to process video data with articulate sound reproduction.

Audiovisual (AV) amplifiers equipped with video input terminals such as HDMI and analog input terminals can be used to supply video data to television receivers and implement audio functionality for producing sounds via speakers. However, AV amplifiers have undergone the foregoing drawback as well.

As sound processing, it is possible to employ various techniques such as dynamic range compression and frequency component compensating extension/enhancement, demonstrating a richness of sound elements. Patent Document 2 discloses a sound volume controller achieving real-time dynamic range compression, whilst Patent Document 3 discloses a sound effect imparting device achieving high-pitch extension and low-pitch enhancement. These audio processing techniques have been developed independently of video processing and are not necessarily adapted to video processing of television receivers yet.

PRIOR ART DOCUMENTS

Patent Document 1: Japanese Patent Application Publication No. 2006-19947
Patent Document 2: Japanese Patent Application Publication No. 2008-306351 (corresponding to United States Patent Application Publication US 2009/0016547)
Patent Document 3: Japanese Patent Application Publication No. 2007-178675 (corresponding to U.S. Pat. No. 7,940,941)

SUMMARY OF THE INVENTION

It is an object of the present invention to provide a content reproduction apparatus that adopts a content processing method, which is able to process audio signals so as to reproduce audio content in an articulate manner depending on the quality of video content.

In one aspect of the present invention, a content reproduction apparatus includes a video analyzer that analyzes video characteristics of video data; and an audio processor that processes audio data in accordance with audio processing determined based on analyzed video characteristics of video data.

The content reproduction apparatus may further include a video processor that processes video data in accordance with video processing determined based on analyzed video characteristics of video data.

In the above, the video analyzer analyzes video characteristics based on attribute information of video data including at least one of a resolution, a compressive distortion, and a real frame rate, wherein the audio processor performs audio processing involving dynamic range compression and/or frequency component extension/enhancement.

In another aspect of the present invention, a control processing method includes a video input step of inputting audio data and video data; a video analyzing step of analyzing video characteristics of video data; and an audio processing step of processing audio data in accordance with audio processing which is determined based on analyzed video characteristics of video data.

In the above, at least one of a resolution, a compressive distortion, and a real frame rate is detected from video data as analyzed video characteristics of video data, wherein the audio processing involves dynamic range compression and/or frequency component extension/enhancement.

Since video data are larger than audio data in terms of the quantity of information, it is possible to analyze video characteristics of video data more elaborately than audio characteristics of audio data. Using analyzed video characteristics of video data, it is possible to accurately determine optimum audio processing depending upon the video quality.

Generally speaking, television receivers are able to process and reproduce video data such that reproduced video images can be displayed on screens with good visual quality. Using analyzed video characteristics, it is possible to smoothly determine optimum audio processing without incurring unwanted overheads or errors.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENT

The present invention will be described in further detail by way of examples with reference to the accompanying drawings.

Figure 1:
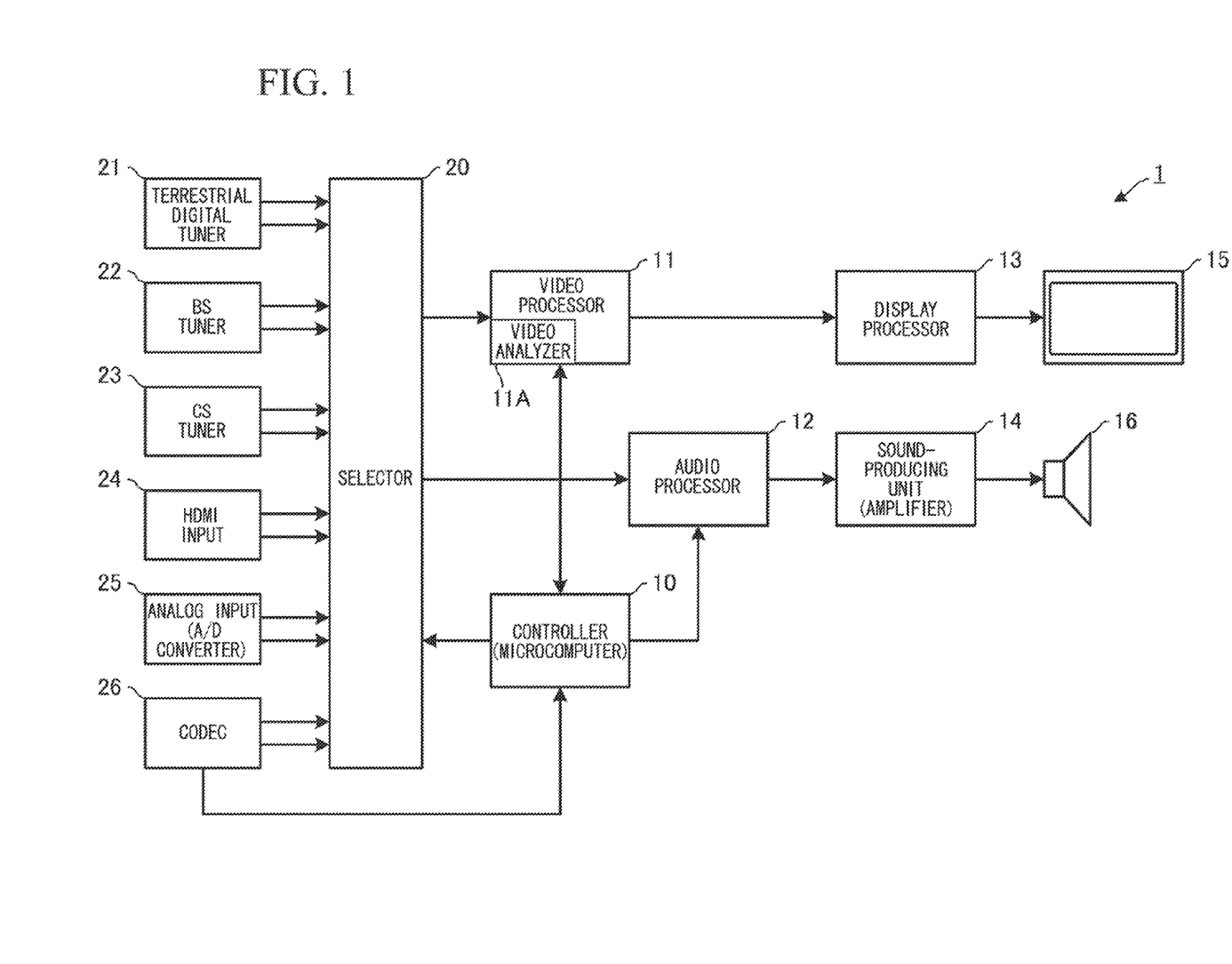
FIG. 1 is a block diagram of a television receiver with a content reproduction/processing functionality according to a preferred embodiment of the present invention.

FIG. 1 is a block diagram of a television receiver 1 with a content reproduction/processing functionality according to a preferred embodiment of the present invention. The television receiver 1 is designed to reproduce television signals and other types of signals such as video data which may resemble television broadcasting formats. Herein, video data is defined as audiovisual content including video content and audio content synchronized with video content. The television receiver 1 is equipped with various tuners for receiving television signals, such as a terrestrial digital tuner 21 (for receiving terrestrial digital broadcasting signals), a BS tuner 22 (for receiving signals from broadcasting satellites), and a CS tuner 23 (for receiving signals from communication satellites). Additionally, the television receiver 1 is equipped with various external video input terminals, such as an HDMI input part 24 and an analog input part 25. The analog input part 25 includes a composite terminal or an S terminal plus a stereo terminal as well as an A/D converter for digitizing input signals thereof. Furthermore, the television receiver 1 includes a CODEC (coder-decoder) 26 (hereinafter, simply referred to as a decoder) for decoding compressed video data. The decoder 26 may be connected to a network cable, a memory card slot, or a USB connector. The decoder 26 is able to decode video streaming files transmitted from the Internet via a network cable. Additionally, the decoder 26 is able to read and decode video files from recoding media such as a memory card inserted into a memory card slot.

A video reproduction unit, including the terrestrial digital tuner 21, the BS tuner 22, the CS tuner 23, the HDMI input part 24, the analog input part 25, and the decoder 26, is connected to the input side of a selector 20. The output side of the selector 20 is connected to a video processor 11 and an audio processor 12. A controller 10 configured of a microcomputer switches over input/output terminals of the selector 20. The selector 20 selects appropriate video data from among a plurality of video data input thereto, so that selected video data are sent to the video processor 11 while audio data accompanied with selected video data are sent to the audio processor 12.

The video processor 11 is connected to a display processor 13, which is also connected to a display 15. The audio processor 12 is connected to a sound-producing unit 14, which is also connected to a speaker 16.

Since the terrestrial digital tuner 21, the BS tuner 22, and the CS tuner 23 receive television signals which have already been optimized to a good picture quality when reproduced and displayed on the screen of the display 15, the video processor 11 directly forwards television signals to the display processor 13. Since the terrestrial digital tuner 21, the BS tuner 22, and the CS tuner 23 receive television signals which have already been optimized to a good sound quality when reproduced by the speaker 16, the audio processor 12 directly forwards television signals to the sound-producing unit 14.

The video processor 11 processes video data, received by the HDMI input part 24, the analog input part 25, or the decoder 26, depending on the quality of video data, so that video images can be clearly displayed (in an easy-to-watch manner for the user) on the screen of the display 15. Video processing is performed to adjust resolutions and video sharpness. Processed video data are sent to the display processor 13. The video processor 13 expands video data in a matrix form so as to produce frame data which is suited to processing on the display 15.

The video processor 11 includes a video analyzer 11A which analyzes the quality of video data. Specifically, the video analyzer 11A analyzes resolutions and compressive distortions of video data which are forwarded thereto from the HDMI input part 24 or the analog input part 25 via the selector 20. The analysis result is utilized in video processing with the video processor 11. The analysis result is also sent to the controller 10.

The controller 10 estimates sound quality based on the analysis result of video data produced by the video analyzer 11A of the video processor 11, so that the controller 10 determines audio processing based on the estimated sound quality. The controller 10 applies the audio processing to the audio processor 12, which in turn performs the audio processing. The audio processing is either a dynamic range compression/expansion process (for compressing or expanding a dynamic range of audio data with a lower sound quality than that of television broadcasting) or a frequency component extension/enhancement process (for compensating or enhancing high-pitch registers in audio data). Processed audio data is sent to the sound-producing unit 14. The sound-producing unit 14 converts processed audio data into analog signals, so that the speaker 16 produces a corresponding sound.

When decoding streaming video data transmitted via a network or video files of recording media, the decoder 26 retrieves attribute information from streaming video data or video files. Herein, the attribute information refers to compression algorithms, resolutions, and color-bit counts of video data, as well as compression algorithms, sampling rates, sampled-bit counts, and bit rates of audio data.

When the selector 20 selects the decoder 26, the controller 10 retrieves the attribute information from the decoder 26. The controller 10 forwards the attribute information of video data to the video processor 11. Based on the attribute information of audio data, the controller 10 determines audio processing compensating for audio data with a lower sound quality than the sound quality of television broadcasting. The controller 10 applies the audio processing to the audio processor 12.

Figure 2A:
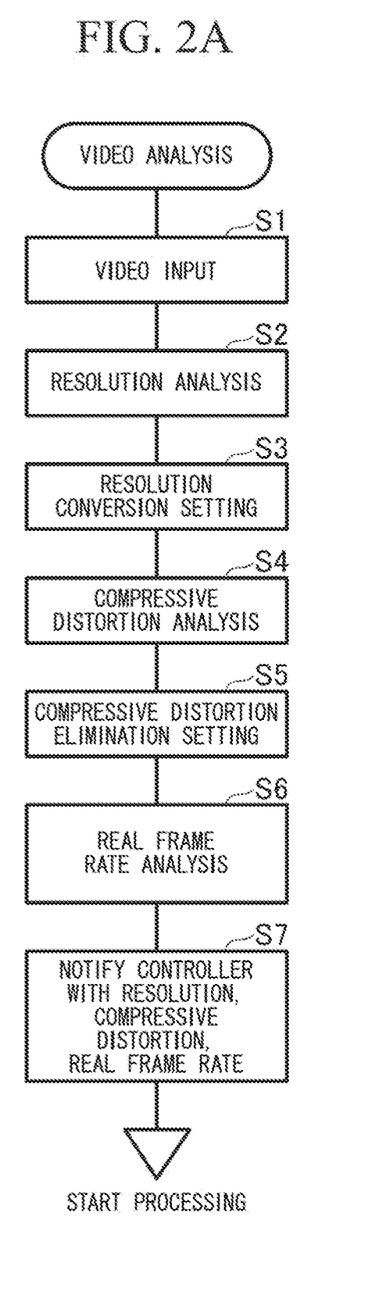
FIG. 2A is a flowchart illustrating a video analysis process of a video analyzer included in a video processor shown in FIG. 1.
Figure 2B:
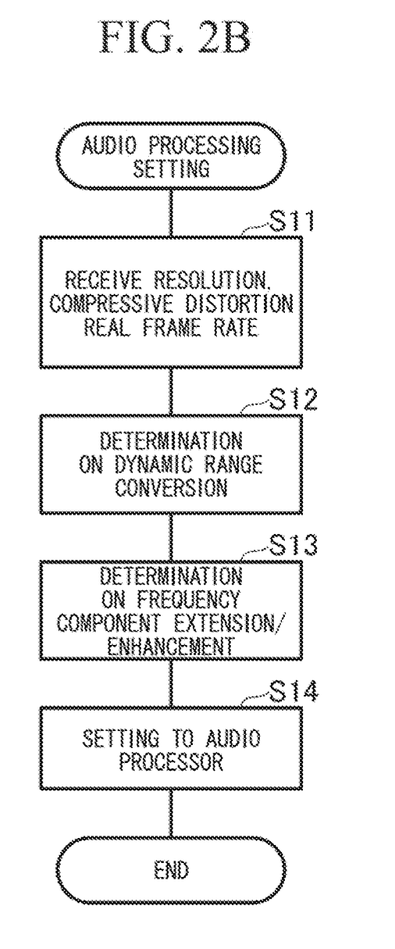
FIG. 2B is a flowchart illustrating an audio processing setting process of the controller shown in FIG. 1.

FIGS. 2A and 2B are flowcharts illustrating the operation of the video processor 11 and the operation of the controller 10. FIG. 2A is a flowchart illustrating a video analysis process of the video analyzer 11A included in the video processor 11. The video analyzer 11A inputs video data in step S1; the video analyzer 11A analyzes resolutions of video data in step S2; and then the video analyzer 11A sets coefficients for converting resolutions of video images displayed on the full screen of the display 15 in step S3. The video analyzer 11A analyzes how many compressive distortions are included in video data in step S4. The following method is adopted to determine the existence/nonexistence of compressive distortions and the number of compressive distortions. This method determines the amount of block noise exemplifying compressive distortions. That is, the video analyzer 11A detects brightness variations with respect to arbitrary vertical dot strings and horizontal dot strings of video data, wherein block noise may exist when a discontinuity is found per each interval (e.g. sixteen dots). It is possible to determine that a large difference between discontinuities may lead to a large amount of block noise. For instance, the video analyzer 11A may apply video processing to soften video images in proportion to the amount of block noise so that edges will not conspicuously appear between blocks of dots in step S5. It is possible to adopt another method for detecting and processing compressive distortions, for example, which detects the amount of mosquito noise so as to eliminate mosquito noise.

Subsequently, the video analyzer 11A analyzes real frame rates in step S6. Video data input to the HDMI input part 24 are adjusted with a frame rate of 60 fps or 120 fps. There is a possibility that original video data with a low frame rate are converted into HDMI-format signals with an HDMI-adapted frame rate. This can be detected by checking motions of images in plural frames, wherein stepwise motions indicate a possibility that frame rates may be increased when video data are converted into HDMI-format signals. It is possible to estimate real frame rates in such a way that video data with a frame rate of 60 fps which stepwisely move per every three frames can be regarded as video data with an original frame rate of 20 fps. Since video data have already been converted into HDMI-format signals which are received by the HDMI input part 24, the foregoing analysis result is not necessarily used in video processing.

The video analyzer 11A sends its analysis result, including resolutions, compressive distortions, and real frame rates, to the controller 10 in step S7. Subsequently, the video processor 11 executes video processing based on the settings of steps S3 and S5.

FIG. 2B is a flowchart illustrating an audio processing setting process of the controller 10. The controller 10 receives resolutions, compressive distortions, and real frame rates from the video processor 11 in step S11. Based on them, the controller 10 determines the amount of dynamic range conversion in step S12 and the amount of frequency component extension/enhancement in step S13.

It is possible to employ various techniques for dynamic range conversion. One technique is to intensely enhance video data with a lower bit rate than video data with a higher bit rate, because low bit-rate video data cause unbalanced sound which is hard to listen to. Another technique is to optimize the sound volume of audio data in a reproducible manner with television speakers by compressing the dynamic range to improve the audibility of low-volume sound or by limiting very high-volume sound with limiters, since video data shot by nonprofessional users, who use consumers' video cameras rather than professional broadcasting devices and who are not accustomed to professional video shooting techniques, may occasionally cause fluctuating sound volume. In step S12, the controller 10 converts dynamic ranges of audio data by using any one of the foregoing techniques or by using a combination of the foregoing techniques. An example of dynamic range compression is disclosed in Patent Document 2. Regarding frequency component extension/enhancement, it can be said that video data with a lower bit rate than video data with a higher bit rate may be increased in compressibility by cutting out the high-pitch and low-pitch range of sound. Considering this, the controller 10 compensates for losses of high-pitch and low-pitch ranges in compressed video data in accordance with estimated bit rates which are estimated based on resolutions, compressive distortions, and real frame rates in step S13. An example of frequency component extension/enhancement is disclosed in Patent Document 3.

The controller 10 applies the audio processing setting, representing the dynamic range conversion and the frequency component extension/enhancement determined in steps S12 and S13, to the audio processor 12 in step S14. Then, the controller 10 exits the audio processing setting process of FIG. 2B. As described above, the audio processing of the audio processor 12 is determined based on the video analysis result produced to determine the video processing of the video processor 11.

In this connection, video analysis can be modified to estimate shooting levels of users, either professional-level users or nonprofessional-level users, based on users' camerawork, e.g. skillful/unskillful panning and zooming. Based on the estimation result, it is possible to determine whether or not to compress dynamic ranges.

It is possible to discriminate skillful/unskillful panning and zooming as follows.

Professional cameramen rarely cause undesired variations of video shooting such as "excessive use of panning/zooming", "very high-speed or uneven speed of panning/zooming", "reciprocating panning", and "slight moving/blurring/ waving of panning". Thus, it is possible to determine unprofessional video shooting, using home video cameras, upon detecting these variations of video shooting. When the television receiver 1 is connected to a video camera, for example, it is possible to determine the audio processing of the audio processor based on resolutions of input vide data. However, it is necessary to intensify dynamic range compression (DRC) since video cameras provide very broad dynamic ranges of sounds.

Next, the dynamic range conversion process of step S12 and the frequency component extension/enhancement process of step S13, based on resolutions of video data detected by the video analyzer 11A, will be described in detail with reference to FIGS. 3A-3D and FIGS. 7A-7F. FIGS. 7A to 7F show examples of audio frequency characteristics which are simulated using frequency component extension/enhancement without dynamic range compression. Generally speaking, compressed video data and analog video signals may provide relatively high correlations between video resolutions and audio sound qualities (or bit rates). Considering this, it is necessary to determine audio processing differently depending on video resolutions.

(1) Video Resolution of 240p (Vertical Scanning Line Count: 240)

Figure 3A:
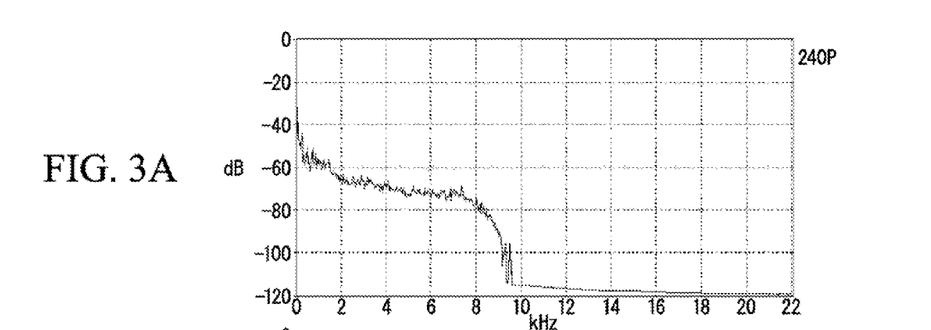
FIG. 3A shows an audio frequency characteristic at a resolution of 240p.

As shown in FIG. 3A, an audio frequency characteristic elongates its high-level duration up to 6 kHz or so, indicating no extensible high-pitch range being detected, wherein it is preferable to slightly extend a low-pitch range such that no fault (due to quantization noise) appears noticeably. Since this audio frequency characteristic is narrow-ranged and unbalanced in sound pressure, it is necessary to intensely apply dynamic range compression (DRC) as follows.

Figure 7A:
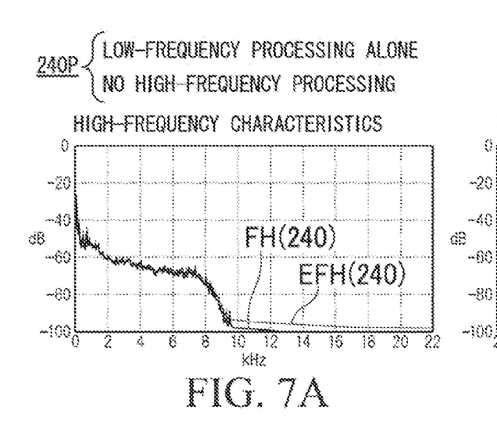
FIG. 7A shows high-frequency characteristics at a resolution of 240p.
Figure 7B:
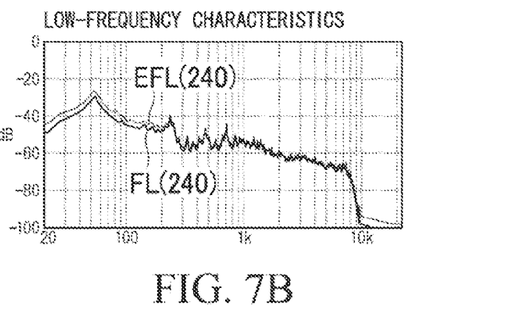
FIG. 7B shows low-frequency characteristics at the resolution of 240p.

High-frequency component extension: zero
Low-frequency component extension: −6 dB
DRC: Intensely applied FIG. 7A shows a high-frequency side of an audio frequency characteristic at a resolution of 240p, wherein FH(240) denotes an original frequency characteristic while EFH(240) denotes an extended frequency characteristic. FIG. 7B shows a low-frequency side of an audio frequency characteristic at the resolution of 240p, wherein FL(240) denotes an original frequency characteristic, and EFL(240) denotes a slightly extended frequency characteristic.

(2) Video Resolution of 360p (Vertical Scanning Line Count: 360)

Figure 3B:
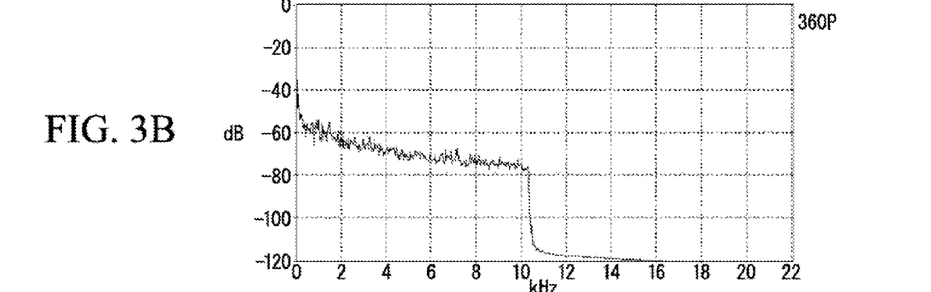
FIG. 3B shows an audio frequency characteristic at a resolution of 360p.

As shown in FIG. 3B, an audio frequency characteristic elongates its high-level duration up to 10 kHz or so, wherein it is preferable to slightly extend a high-pitch range with frequency components of several tens of kilo-hertz (kHz) or more such that no fault (due to quantization noise) appears noticeably. Since this audio frequency characteristic is narrow-ranged and unbalanced in sound pressure, it is necessary to intensely apply dynamic range compression (DRC) as follows.

Figure 7C:
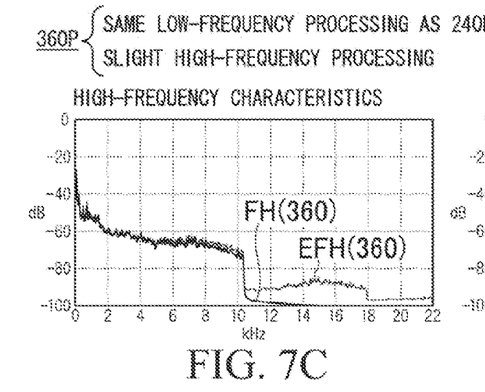
FIG. 7C shows high-frequency characteristics at a resolution of 360p.
Figure 7D:
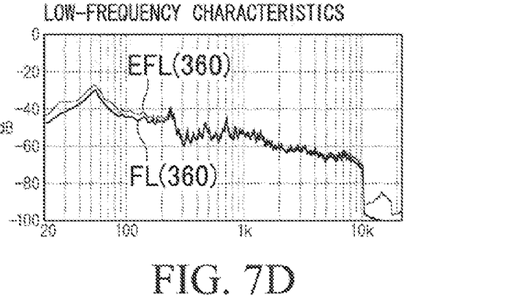
FIG. 7D shows low-frequency characteristics at the resolution of 360p.

High-frequency component extension: −6 dB
Low-frequency component extension: −6 dB
DRC: Intensely applied FIG. 7C shows a high-frequency side of an audio frequency characteristic at a resolution of 360p, wherein FH(360) denotes an original frequency characteristic, and EFH(360) denotes a slightly extended frequency characteristic. FIG. 7D shows a low-frequency side of an audio frequency characteristic at the resolution of 360p, wherein FL(360) denotes an original frequency characteristic while EFL(360) denotes a slightly extended frequency characteristic with the same degree of extension as EFL(240p).

(3) Video Resolution of 480p (Vertical Scanning Line Count: 480)

Figure 3C:
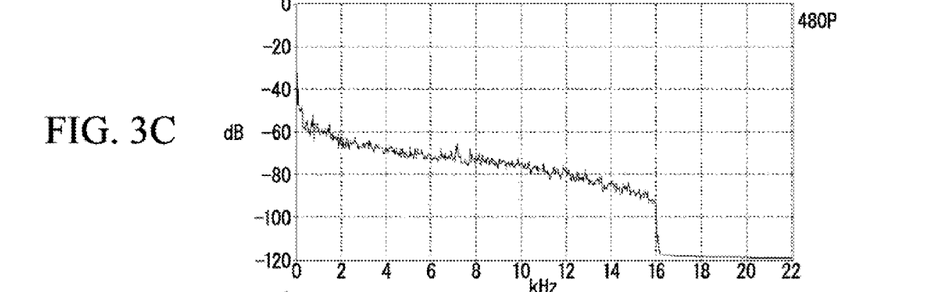
FIG. 3C shows an audio frequency characteristic at a resolution of 480p.

As shown in FIG. 3C, an audio frequency characteristic elongates its high-level duration up to 16 kHz or so, wherein it is preferable to noticeably extend a high-pitch range with frequency components of several tens of kilo-hertz (kHz) so that extended components will not be covered within original components, thus demonstrating an outstanding effect. Since this audio frequency characteristic is slightly narrow-ranged, it is necessary to intermediately apply dynamic range compression (DRC) as follows.

Figure 7E:
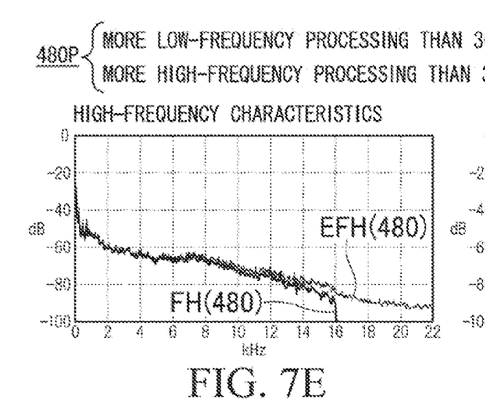
FIG. 7E shows high-frequency characteristics at a resolution of 480p.
Figure 7F:
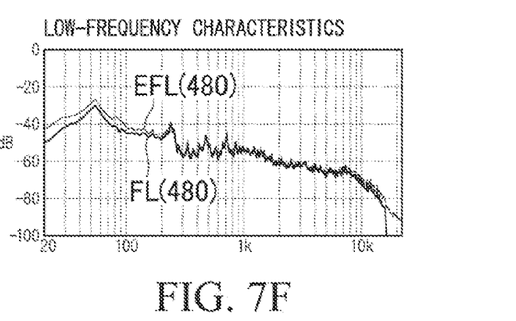
FIG. 7F shows low-frequency characteristics at the resolution of 480p.

High-frequency component extension: −3 dB
Low-frequency component extension: −3 dB
DRC: Intermediately applied FIG. 7E shows a high-frequency side of an audio frequency characteristic at a resolution of 480p, wherein FH(480) denotes an original frequency characteristic, and EFH(480) denotes an extended frequency characteristic which is extended longer to improve connectivity with the original frequency characteristic. FIG. 7F shows a low-frequency side of an audio frequency characteristic at the resolution of 480p, wherein FL(480) denotes an original frequency characteristic, and EFL(480) denotes an extended frequency characteristic which is extended at a higher rate then EFL(360) to demonstrate a good effect.

(4) Video Resolution of 720p (Vertical Scanning Line Count: 720)

Figure 3D:
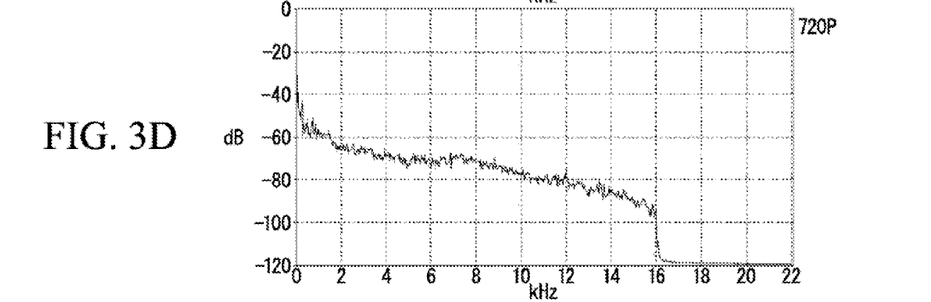
FIG. 3D shows an audio frequency characteristic at a resolution of 720p.

As shown in FIG. 3D, an audio frequency characteristic elongates its high-level duration up to 16 kHz or so. It can be said that the internet content with a high resolution may be occasionally limited in a frequency band of audio data. For this reason, similar to video data with the resolution of 480p, it is preferable to intensely extend a high-pitch range with frequency components of several tens of kilo-hertz (kHz) so that extended components will not be covered within original components, thus demonstrating an outstanding effect. Since this audio frequency characteristic is slightly narrow-ranged, it is necessary to intermediately apply dynamic range compression (DRC) as follows.

High-frequency component extension: −3 dB
Low-frequency component extension: −3 dB
DRC: no application Since attribute information (property) has been included in streaming video data or video files of recording media, the decoder (CODEC) 26 is able to decode video data or video files based on attribute information. The attribute information is also delivered to the controller 10 and used for determination of the video processing of the video processor 11 and the audio processing of the audio processor 12.

Figure 4:
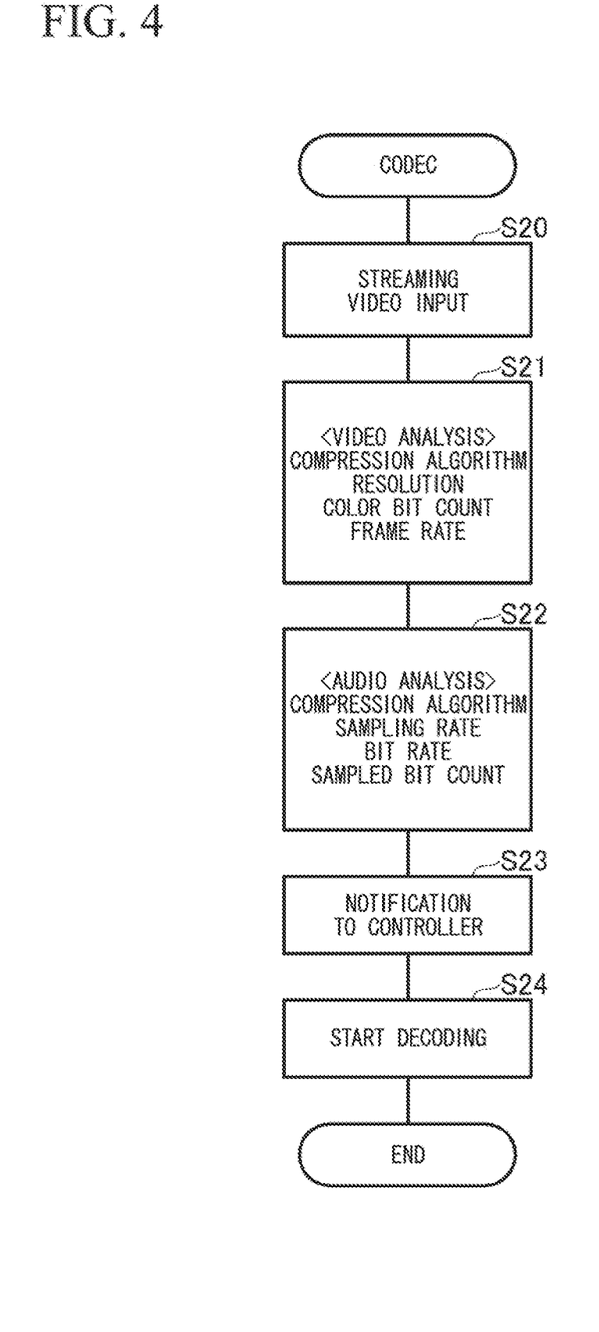
FIG. 4 is a flowchart illustrating the operation of a decoder shown in FIG. 1.

FIG. 4 is a flowchart illustrating the operation of the decoder 26 when decoding streaming video data transmitted via a network. First, the decoder 26 inputs streaming video data in step S20. Then the decoder 26 conducts audiovisual analysis on streaming video data in steps S21 and S22. The audiovisual analysis is performed based on attribute information extracted from streaming video data. As video attribute information, the decoder 26 reads compression algorithms, resolutions, color-bit counts, and frame bits from the attribute information. As audio attribute information, the decoder 26 reads compression algorithms, sampling rates, bit rates, and sampled bit counts from the attribute information. The decoder 26 sends audiovisual attribute information to the controller 10 in step S23. The controller 10 delivers the video attribute information to the video processor 11. Additionally, the controller 10 determines audio processing of the audio processor 12 based on the audio attribute information. The decoder 26 starts decoding video data based on the attribute information in step S24.

In this case, the video processor 11 may determine its video processing based on the video analysis result of the video analyzer 11A in addition to the video attribute information which is provided by the controller 10. Additionally, the controller 10 may determine audio processing based on the video analysis result of the video analyzer 11A in addition to the audio attribute information which is provided by the decoder 26.

When the controller 10 fails to retrieve the video attribute information from the decoder 26, in other words, when the decoder 26 is not configured to provide attribute information, the video processor 11 needs to analyze video data so as to determine video/audio processing regardless of the decoder 26 decoding and reproducing video data.

It is possible to perform the following processes based on audio bit rates which are successfully detected from attribute information extracted by the decoder 26.

(1) Audio Bit Rate of 32 Kbps

Figure 5A:
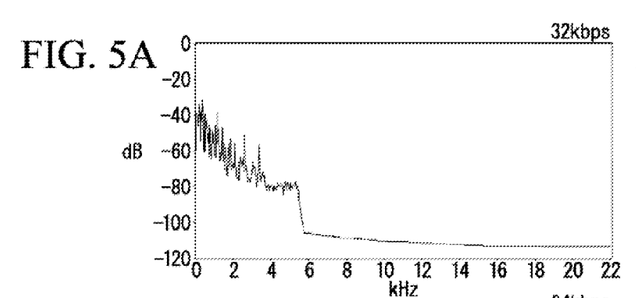
FIG. 5A shows an audio frequency characteristic at an audio bit rate of 32 kbps.

As shown in FIG. 5A, an audio frequency characteristic elongates its high-level duration up to 6 kHz or so indicating no extensible high-pitch range detected, wherein it is preferable to slightly extend a low-pitch range such that no fault (due to quantization noise) appears noticeably. Since this audio frequency range is narrow-ranged and unbalanced in sound pressure, it is necessary to intensely apply dynamic range compression (DRC) as follows.

Figure 5B:
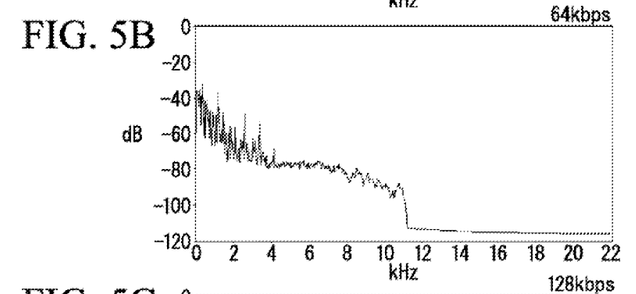
FIG. 5B shows an audio frequency characteristic at an audio bit rate of 64 kbps.

High-frequency component extension: zero
Low-frequency component extension: −6 dB
DRC: intensely applied (2) Audio Bit Rate of 64 kbps As shown in FIG. 5B, an audio frequency characteristic elongates its high-level duration up to 10 kHz or so, wherein it is preferable to slightly extend a high-pitch range with frequency components of several tens of kilo-hertz (kHz) such that no fault (due to quantization noise) appears noticeably. Since this audio frequency range is narrow-ranged and unbalanced in sound pressure, it is necessary to intensely apply dynamic range compression (DRC) as follows.

Figure 5C:
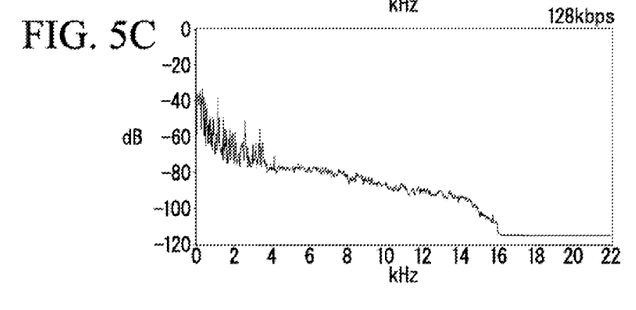
FIG. 5C shows an audio frequency characteristic at an audio bit rate of 128 kbps.

High-frequency component extension: −6 dB
Low-frequency component extension: −6 dB
DRC: intensely applied (3) Audio Bit Rate of 128 Kbps As shown in FIG. 5C, an audio frequency characteristic elongates its high-level duration up to 16 kHz or so, wherein it is preferable to intensely extend a high-pitch range with frequency components of several tens of kilo-hertz (kHz) such that extended components will not be covered within original components, thus demonstrating an outstanding effect. Since this audio frequency range is narrow-ranged, it is necessary to intermediately apply dynamic range compression (DRC) as follows.

Figure 5D:
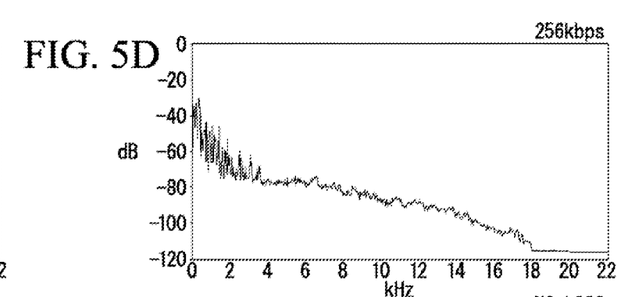
FIG. 5D shows an audio frequency characteristic at an audio bit rate of 256 kbps.

High-frequency component extension: −3 dB
Low-frequency component extension: −3 dB
DRC: intermediately applied (4) Audio Bit Rate of 256 Kbps As shown in FIG. 5D, an audio frequency characteristic elongates its high-level duration up to 18 kHz or so, wherein it is preferable to intensely extend a high-pitch range with frequency components of several tens of kilo-hertz (kHz) such that extended components will not be covered within original components, thus demonstrating an outstanding effect. Since this audio frequency range is broad-ranged, it is necessary to slightly apply dynamic range compression (DRC) as follows.

Figure 5E:
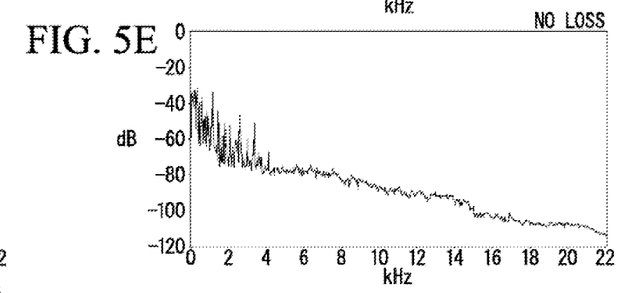
FIG. 5E shows an audio frequency characteristic at an audio bit rate of 1,500 kbps.

High-frequency component extension: 0 dB
Low-frequency component extension: 0 dB
DRC: slightly applied (5) Audio Bit Rate of 1,500 Kbps without Loss As shown in FIG. 5E, an audio frequency characteristic elongates its high-level duration up to Nyquist frequency (e.g. 22 kHz) or so, wherein it is unnecessary to extend a high-pitch range since no loss is detected in terms of frequencies. Since this audio frequency characteristic does not undergo an unbalanced sound pressure, it is unnecessary to apply dynamic range compression (DRC) as follows.

High-frequency component extension: 0 dB
Low-frequency component extension: 0 dB
DRC: not applied.

It is possible to make the following presumption based on attribute information retrieved by the decoder 26. Video images with specific resolutions (whose aspect ratios are not 16:9 or 4:3) and video images with special frame rates (e.g. 15 fps) may not be presumed as good video images shot by video-shooting devices, but they are highly likely produced via processing of personal computers; hence, low audio bit rates can be assumed therefor.

Even when video images include attribute information indicating a high audio bit rate, there is a possibility that those video images may be compressed and then expanded. For this reason, it is possible to estimate sound quality based on frequency characteristics irrespective of bit rates, so that optimum audio processing can be determined based on the estimated sound quality.

The present embodiment refers to the television receiver 1, but the present invention is not necessarily limited to television receivers. For instance, the present invention is applicable to an audiovisual (AV) amplifier with video processing functionality.

Figure 6:
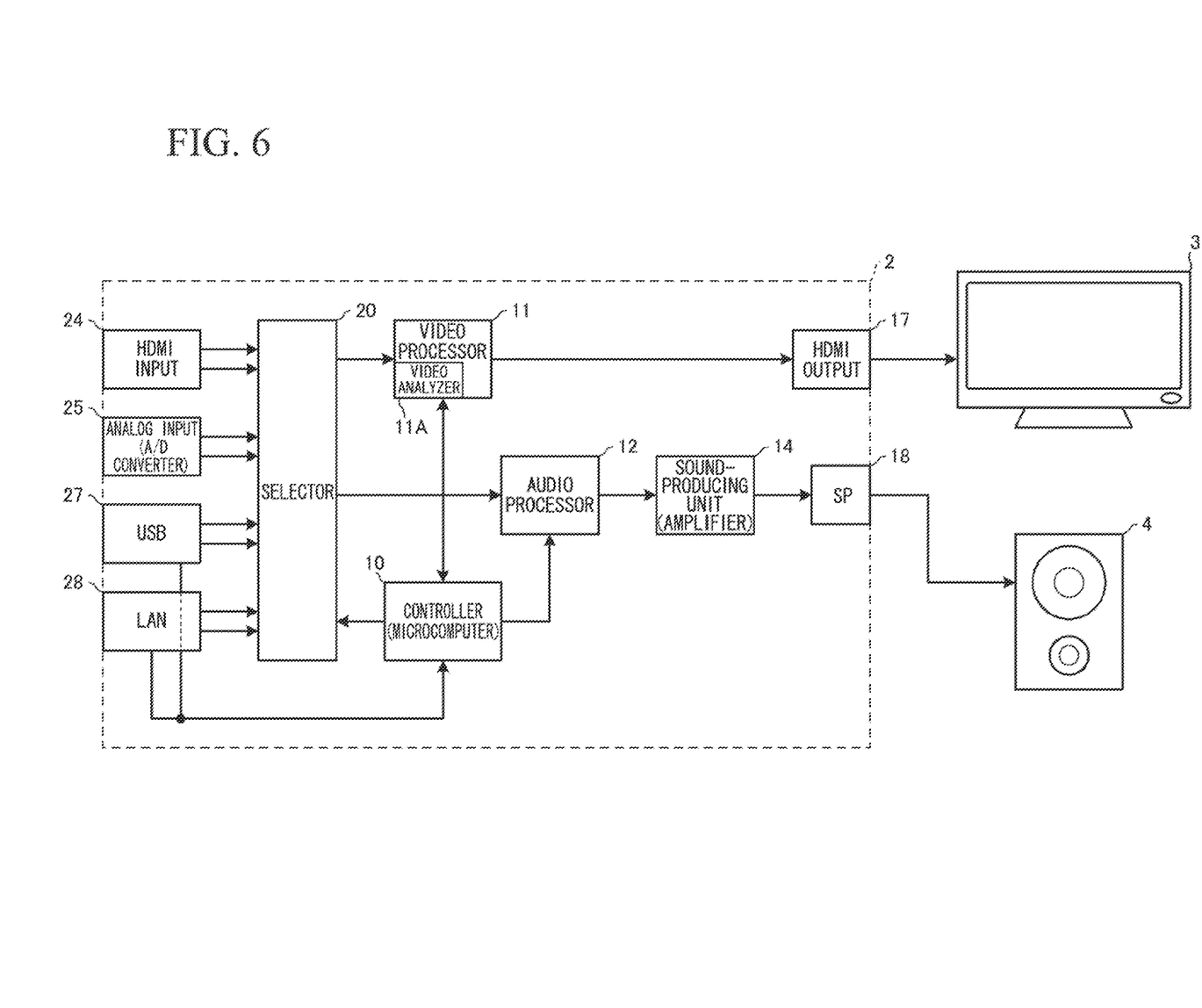
FIG. 6 is a block diagram of an audiovisual (AV) amplifier according to another embodiment of the present invention.

FIG. 6 is a block diagram of an AV amplifier 2 according to another embodiment of the present invention. In FIG. 6, constituent parts identical to the foregoing constituent parts of the television receiver 1 shown in FIG. 1 are designated by the same reference numerals; hence, the description thereof will be omitted. The AV amplifier 2 can be equipped with audio source input terminals in addition to the audiovisual source input terminals which are shown in FIG. 6. The selector 20 of the AV amplifier 2 includes a USB part 27 and a LAN part 28 in addition to the HDMI input part 24 and the analog input part 25.

The video processor 11 is connected to an HDMI output part 17, which is connected to an external television receiver 3. Video data processed by the video processor 11 is transmitted to the television receiver 3 via the HDMI output part 17, so that a video image thereof is displayed on the screen of the television receiver 3. The sound-producing unit 14 (including an amplifier) is connected to a speaker terminal (SP) 18, which is connected to an external speaker 4. Audio data processed by the audio processor 12 is transmitted to the speaker 4 via the speaker input terminal 18, so that a sound thereof is produced by the speaker 4.

The USB part 27 includes a USB interface which is able to install a recording media storing video files. The USB part 27 further includes a decoder to read and decode video files from recording media. The USB part 27 extracts attribute information from video files (which are read and decoded by the decoder) so as to send the attribute information to the controller 10. The LAN part 28 receives streaming video data transmitted thereto via a network, wherein the LAN part 28 includes a decoder to decode streaming video data to reproduce non-compressed video data and audio data. The LAN part 28 extracts attribute information from streaming video data (which are read and decoded by the decoder) so as to send the attribute information to the controller 10. In this connection, the AV amplifier 2 can be modified such that both the USP part 27 and the LAN part 28 share the same decoder (e.g. CODEC).

Lastly, the present invention is not necessarily limited to the foregoing embodiments, which can be further modified in various ways within the scope of the invention as defined by the appended claims.

What is claimed is:

1. A content reproduction apparatus for inputting and reproducing audio data having a predetermined bit rate, the apparatus comprising:
   a bit rate detector configured to detect the bit rate of the input audio data; and
   an audio processor configured to compress a dynamic range of the input audio data or supplement the input audio data with frequency components in response to the detected bit rate of the input audio data, and reproduce the input audio data,
   wherein the audio processor decreases a degree of compression applied to the dynamic range of the input audio data while increasing a degree of supplementation of the frequency components as the detected bit rate of the input audio data increases, and.
   wherein the audio processor increases the degree of compression applied to the dynamic range of the input audio data while decreasing the degree of supplementation of the frequency components as the detected bit rate of the input audio data decreases.

2. The content reproduction apparatus according to claim 1, wherein when the detected bit rate is equal to or greater than a first predetermined bit rate, which is sufficient to not cause a loss of audio data, the audio processor does not compress the dynamic range of the input audio data and does not supplement the input audio data with the frequency components.

3. A content reproduction method comprising:
   an inputting step of inputting audio data having a predetermined bit rate;
   a bit rate detecting step of detecting, with a bit rate detector, the bit rate of the input audio data;
   an audio processing step of compressing a dynamic range of the input audio data or supplementing the input audio data with frequency components in response to the detected bit rate of the input audio data, with an audio processor;
   wherein the audio processing step decreases a degree of compression applied to the dynamic range of the input audio data while increasing a degree of supplementation of the frequency components as the detected bit rate of the input audio data increases, and
   wherein the audio processing step increases the degree of compression applied to the dynamic range of the input audio data while decreasing the degree of supplementation of the frequency components as the detected bit rate of the input audio data decreases; and
   an audio reproduction step of reproducing, with the audio processor, the input audio data, in accordance with the audio processing step.

4. The content preproduction method according to claim 3, wherein when the detected bit rate is equal to or greater than a first predetermined bit rate, which is sufficient to not cause a loss of audio data, the audio processing step does not compress the dynamic range of the input audio data and does not supplement the input audio data with the frequency components.

* * * * *